T. W. GORMAN.
GAS HEATER AND VAPORIZER.
APPLICATION FILED FEB. 23, 1921.
1,424,898.
Patented Aug. 8, 1922.
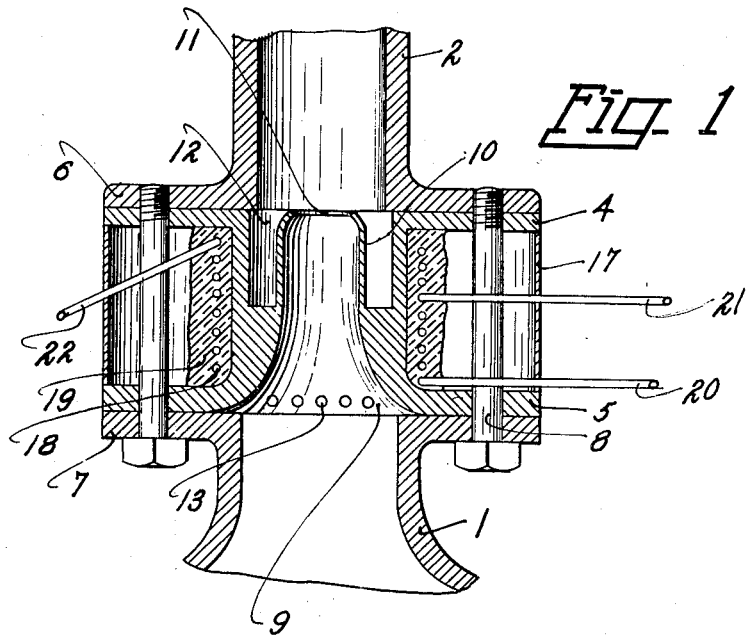
Fig. 1
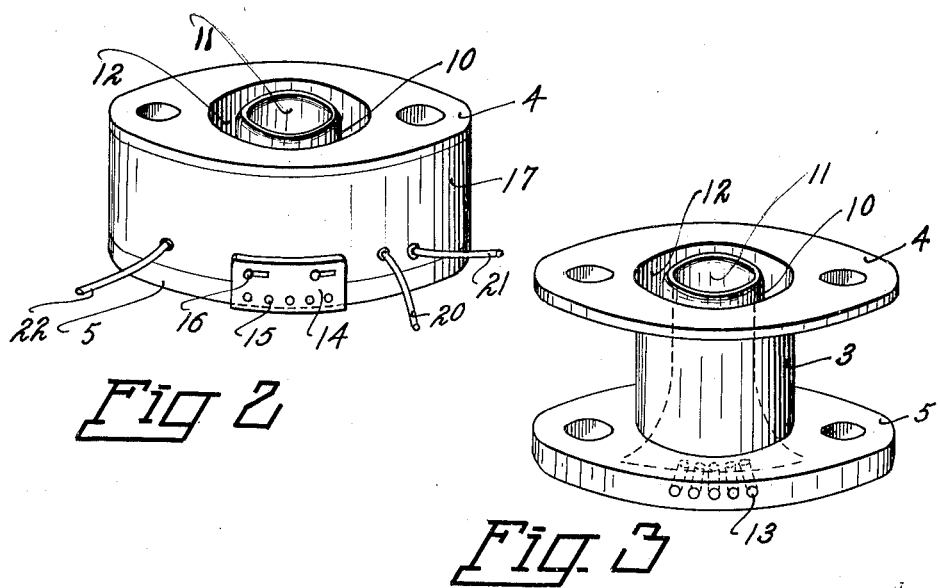
Fig. 2
Fig. 3
Inventor
Tomas W. Gorman
By Herbert E. Smith
Attorney

UNITED STATES PATENT OFFICE.

THOMAS W. GORMAN, OF SPOKANE, WASHINGTON.

GAS HEATER AND VAPORIZER.

1,424,898.  Specification of Letters Patent.  Patented Aug. 8, 1922.

Application filed February 23, 1921. Serial No. 447,314.

*To all whom it may concern:*

Be it known that I, THOMAS W. GORMAN, a citizen of the United States, residing at Spokane, in Spokane County and State of Washington, have invented certain new and useful Improvements in Gas Heaters and Vaporizers, of which the following is a specification.

My present invention relates to an improved gas heater and vaporizer especially adapted for use in connection with the carbureter of an internal combustion engine. The primary object of the invention is means, preferably electric resistance coils, for applying heat to the ingredients of the fuel charge of the engine as it passes from the carbureter through the intake manifold to the engine. The invention consists essentially in interposing a heating element between the carbureter and the intake manifold, which involves a special form of bushing having external resistance coils or wires of comparatively high heating qualities for use in starting the engine, and also adapted to generate a lesser degree of heat for assisting in vaporizing the gaseous fuel after the engine has been started and is running, thus controlling and adapting the heat units as required for these purposes.

The invention also contemplates the utilization of means within the bushing for recovering and receiving sprayed liquid gas that may not be sufficiently vaporized and subsequently, by heat, vaporizing this excess liquid gas. The invention further resides in furnishing said bushing with controlled air ducts for supplying the necessary oxygen to the mixing chamber for the fuel charge in its passage to the intake manifold, and in certain other novel combinations and arrangements of parts as will be more fully described and claimed.

In the accompanying drawings I have illustrated one complete example of the physical embodiment of my invention wherein the parts are combined and arranged according to the best mode I have thus far devised for the practical application of the principles of my invention.

Figure 1 is a view showing so much of a carbureter and intake manifold of an internal combustion engine as is necessary to illustrate the application thereto of my invention, depicting the device in section.

Figure 2 is a perspective view of the device forming the subject matter of the invention, detached, showing the air control damper.

Figure 3 is a perspective view of the flanged bushing detached.

In order that the assembly of parts may be readily understood I have designed the members 1 and 2 in Figure 1 as the carbureter and intake manifold respectively of an internal combustion engine using fuel gas, and between these members is interposed the bushing 3, which is cylindrical in form, preferably of aluminum or similar material, and conforms to the area of passages of the carbureter and manifold as shown. The bushing is fashioned with wide upper and lower flanges 4 and 5 and it is interposed between the complementary flanges 6 and 7 of the manifold and carbureter casing, the several flanges being perforated for the attaching bolts 8 as shown.

At its end adjacent the carbureter the bushing is fashioned with a Venturi opening 9, whose walls taper upwardly and inwardly to constitute a mixing chamber, and these walls terminate in a tubular extension or centrally located nozzle 10, also circular or cylindrical in cross section and provided with a restricted or inturned exit or mouth 11. In the upper end of the bushing the nozzle forms an annular space 12 which performs the function of a drip cup for catching and receiving drops of non-vaporized gas which may pass from the nozzle, but are too large to be drawn by suction through the manifold, or are not sufficiently vaporized by the heat in their passage through the mixing chamber. This liquid gas, however, is subsequently vaporized, as will be described.

Air or oxygen as a fuel ingredient is supplied to the mixing chamber through a series of air ducts 13 associated together, extending transversely through the flange 5 and establishing communication from the atmosphere to the interior of the mixing chamber 9. Passage of air through the ducts is controlled by the slotted slide plate or damper 14, which is provided with ports 15 to register with the ducts 13, and the damper is supported by pins 16 as shown in Figure 2 in order that it may be moved to contract or increase the inlet of air in manner well understood.

The pins 16 are fixed to a casing or jacket 17 and an opening is provided in the jacket for admission of air through the ports and ducts. The jacket may be of suitable metal and is attached to the flanges of the bushing, overlapping these flanges to provide an effective covering or casing for the heating element, which is here shown as resistance coils 18 for electric current, that are embedded in a casing or shield of plaster Paris 19 or other heat and electric insulating material.

The heating coil or element is shown in Figure 1 as equipped with a lead or conductor 20 for utilizing the coil to generate a comparatively high seat, and with another lead or conductor 21 for utilizing a portion of the coil to create a lesser degree of heat, both circuits of which these leads form a part being comprised with or including a common lead 22. Thus, when starting the engine a comparatively high temperature in the heating element is required, and the circuit of which wires 20—22 form a part is closed for the purpose. After the engine has been running for a sufficient time a lesser degree of heat may be utilized to accomplish the vaporization of the fuel charge, and the low degree circuit of which wires 21—22 form a part is used, the high-degree circuit of course being cut out.

Due to suction the gas is drawn from the carbureter through the Venturi opening or mixing chamber 9, where the controlled passage of air through the air ducts causes a mingling of the gas and air currents. The fuel charge passes through the nozzle to the manifold and thence to the engine, and as it passes through the bushing is vaporized by the heat radiated from the inner walls of the bushing and mixing chamber which walls of course are heated by the resistance coils or heating element. Any drops of liquid gas that may fall into the drip cup will be vaporized therein by the radiated heat, and the vapor thus drawn by suction to the engine. Condensed gas that may accumulate in the cup may thus be heated and vaporized for use in starting the engine.

Claims:

1. The combination with the manifold and carbureter, of an interposed bushing having a mixing chamber and formed with a nozzle disposed centrally therein, said bushing having air ducts leading to the mixing chamber and means for controlling admission therethrough, and a heating element surrounding said bushing for the purpose described.

2. The combination with the manifold and carbureter, of an interposed bushing having a Venturi space forming a mixing chamber and means for admitting air to said chamber, the walls of said space merging in an upwardly projecting restricted nozzle forming an annular drip cup as described, and a heating element for the bushing for the purpose described.

3. The combination with a carbureter and manifold having flanges as described, of an interposed bushing having complementary attaching flanges and bolts, said bushing fashioned with a Venturi opening forming a mixing chamber, a series of air ducts in one of the bushing flanges communicating with said chamber, a damper for controlling admission of air to said ducts, a nozzle formed within said bushing, and a heating element for the bushing.

4. The combination with a bushing having a Venturi opening, of an inner centrally disposed nozzle extending from the walls of said opening and forming an annular drip cup within the bushing, and a heating element for the bushing.

5. The combination with the manifold and carbureter of an interposed bushing having a mixing chamber and means for admitting air thereto, the walls of said chamber merging into an unwardly projecting centrally disposed nozzle forming an annular drip cup within the bushing, an electric heating coil surrounding said bushing, said coil having a circuit for utilizing its full heating capacity and another circuit for utilizing a portion of its capacity, for the purpose described.

6. The combination with a bushing having a Venturi opening and nozzle, of an electric coil surrounding said bushing, said coil having a circuit for utilizing its full heating capacity and another circuit for utilizing a portion of its heating capacity.

In testimony whereof I affix my signature.

THOS. W. GORMAN.